T. NAKAMIGAWA.
FLY TRAP.
APPLICATION FILED DEC. 18, 1915.
1,252,151. Patented Jan. 1, 1918.
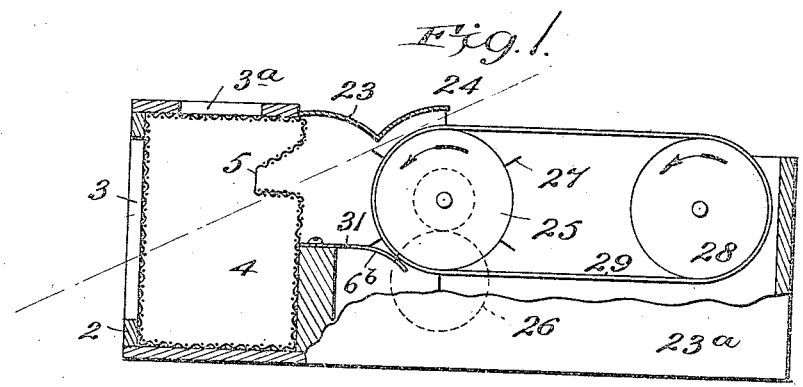
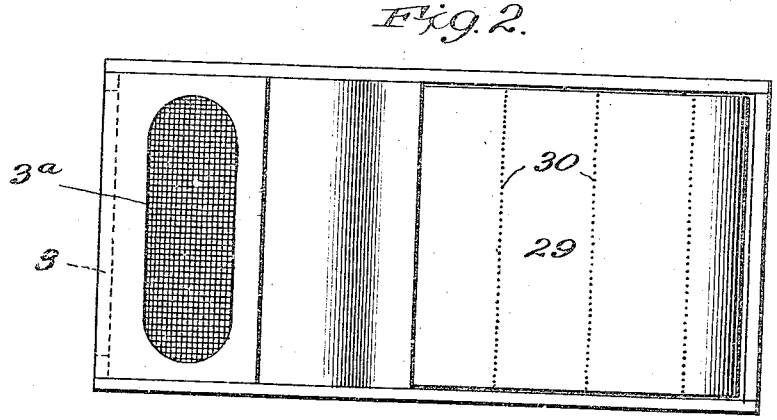
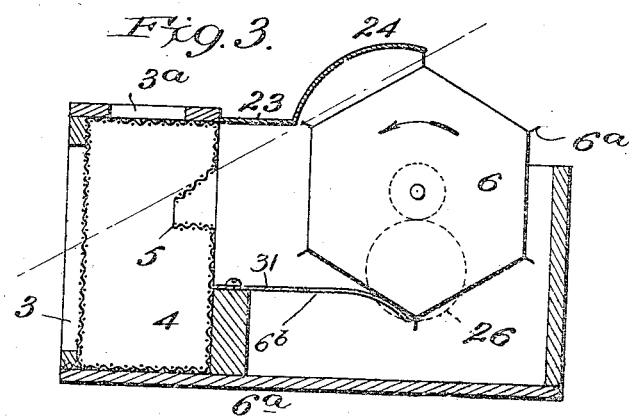

UNITED STATES PATENT OFFICE.

TETSUSHIRO NAKAMIGAWA, OF NEW YORK, N. Y.

FLY-TRAP.

1,252,151.　　　Specification of Letters Patent.　　Patented Jan. 1, 1918.

Application filed December 18, 1915.　Serial No. 67,662.

*To all whom it may concern:*

Be it known that I, TETSUSHIRO NAKAMIGAWA, a subject of the Emperor of Japan, residing at New York, in the county of New York and State of New York, have invented new and useful Improvements in Fly-Traps, of which the following is a specification.

This invention relates to fly traps and has for its primary object the provision of a revolving baiting and conducting element and a receiving receptacle associated therewith and opening thereonto formed of transparent material which is exposed at all times to the light and designed with a view of permitting the light to be projected obliquely or tangentially of the revolving element and across the path of rotation thereof at its immediate entrance to the receptacle whereby the light when so presented will possess the office of a highly efficient attracting medium serving to induce the flies or insects to remain on said element until they are safely lodged in said receptacle.

Another object of the invention is to provide a trap of this character which will include a revolving trapping element and a receiving receptacle, the latter being formed of transparent material and serving to permit the light to be projected in the direction of a transparent hood which is partly disposed over the revolving element and means on the element co-acting with the hood to form a guard to prevent accidental escape of the flies from between the hood and said element during the catching and trapping periods of its rotation, the said means being designed also with a view of preventing any material obstruction of the light rays at the stated point relatively of the revolving element at any time during the rotation of said element, or in other words, to provide coacting elements of a trap in which light may be satisfactorily used as a bait and constantly exposed in the trapping path of the insects.

In the drawings forming a part of this specification and in which like reference numerals indicate similar parts in the several views:—

Figure 1 is a side view of the trap, showing parts broken away and parts in section.

Fig. 2 is a top plan view thereof.

Fig. 3 is a vertical longitudinal section through the trap showing a slightly modified form thereof.

Fig. 4 is a detail view of parts of the trap.

As shown in Figs. 1 and 2 of the drawings, the hood, indicated at 23, is provided with an arcuate inlet section 24. A roller 25 is journaled in the casing $23^a$ below the arcuate section 24 and is operatively connected in any suitable manner with a motor indicated conventionally. The roller 25 is provided upon its periphery with several rows of pins 27, the said rows being spaced from each other. A roller 28 is journaled in the casing 1 and a belt 29 is trained around the rollers 25 and 28. The belt 29 is provided with several rows of openings 30 adapted to receive the pins 27 as the said belt passes around the roller 25. A ledge 31 is mounted in the casing 1 below the hood 23 and spaced from the same and the edge portion of the said ledge 30 terminates in the vicinity of the path of movement of the pins 27 and beyond the extremities thereof.

Consequently when the flies light upon the belt 29 they are carried under the arcuate section 24 and the pins 27 which pass through the openings 30 and follow the flies close the said section 24 and the flies are compelled to pass under the hood 23. When they arrive under the hood they observe beams of light coming through the cage 4 from the opening 3 in the panel 2 and through said transparent hood 24 and consequently the flies pass through the run-ways 5 toward the openings 3 and are trapped in the cage 4. The run-ways 5 are disposed relatively of the inlet end of the hood 24 and the openings 3 so that the beams of light which enter the cage 4 will be projected obliquely, as shown in the dotted lines in Fig. 1 and said light beams will be also presented at a tangent to the roller 25. The hood 24 is formed of transparent material and by projecting the light at a tangent to the said roller 25, it follows, that light which emanates from the cage 4 will be used to proper advantage toward inviting the flies. The pins 27 serve to permit free passage of light through said hood at all times and as a consequence thereof the main path of entrance to the cage will be fully exhibited. In the form of the invention shown in Fig. 3 of the drawing, a polylateral roller 6 is journaled for rotation in the casing 1 and is operated in any suitable manner by a motor indicated at 26 by the dotted lines in the said figure. Part of the roller is disposed under the section 24 of the hood 23 and consequently, when the flies alight upon the flat sides of the roller 32 they are carried under the section 24 and are forced to move in a downward direction toward and under the hood 23. From under the hood 23 the flies pass through the run-ways 5 into the cage 4. In this form of the invention the ledge 31 is of resilient material and bears against the side of the roller. Consequently the flies cannot follow the movement of the roller around in the casing and escape. After the flies pass under the section 24 they must pass through the run-ways 5 into the cage 4. In all forms of the invention, the cage 4 is of the same pattern or design, and in all forms an automatic fly trap structure is provided. If desired sugar or other bait may be applied to the parts upon which the flies originally alight for the purpose of luring them toward the trap.

The panels 2 shown in both forms of the invention, are removable from the casing so that the cages containing the entrapped insects may be removed as the occasion may demand. Each of the casings is provided with a light opening 3a disposed at an angle to the opening 3 whereby to increase the projection of light rays in the direction of the intake end of the hood 24. The spaced pins hereinbefore referred to serve to permit the light to be constantly projected at an oblique angle to the hood 24, thus acting as a permanent and uniform attracting medium for the insects during the whole period of operation of the revolving trapping element.

In the form of the invention shown in Fig. 3 the roller 6 is provided with longitudinal rows of pins 6a which are arranged at the vertexes of the angular walls of the roller and they are adapted to permit the light to be projected at the described oblique angle relatively of the hood 24, at all times. The flat faces of the roller are proportioned with such regard to the width of the hood 24 as to permit adjacent rows of the pins 6a to operate beneath the hood with a view to preventing the flies or insects from effecting an escape from the hood as will be understood.

The ledge 31 is provided with short spaces or slots 6b through which the pins 27 are adapted to pass. In this manner, undue friction between the parts is avoided.

What is claimed as new is:—

1. In a fly trap an open top casing provided with a hood adjacent one end thereof, and said hood having an arcuate inlet, a roller journaled in the casing below the hood, radially disposed spaced pins arranged in rows on the periphery of the roller, a paneled cage having a transparent front and a transparent top connected with the hood and disposed outward of the roller, the inner wall of said cage having a transversely arranged, inwardly extending runway, a horizontally disposed ledge below the said runway and having its outer portion rounded downwardly and frictionally engaged with the roller and the belt carried thereby, and the said rounded portion of the ledge having openings through which the pins of the roller pass when the said roller is rotated and means for imparting such rotary movement to said roller.

2. In a fly trap, a casing having an open top, a hood having an arcuate inlet arranged transversely of the top adjacent one of the ends of the casing, a roller journaled in the casing below the hood, radially disposed spaced pins on the periphery of the roller, a second roller journaled in the casing, an endless belt having spaced rows of openings trained around both rollers and the pins of the first mentioned roller passing through the said openings in the said belt, a paneled cage having a transparent front and a transparent top connected with the hood and secured to the casing and disposed outward of the first mentioned roller, the inner wall of the hood having a transverse inwardly extending runway, a horizontally disposed spring ledge below said runway and having its outer portion rounded downwardly to frictionally engage beneath the first mentioned roller and the belt carried thereby, said rounded end of the ledge having openings through which the pins of the first mentioned roller pass when the said roller is rotated, and means for imparting a rotary movement to the said roller.

In testimony whereof I, affix my signature in presence of two witnesses.

TETSUSHIRO NAKAMIGAWA.

Witnesses:
ANNA V. DOYLE,
GEO. A. BYRNE.

Copies of this patent may be obtained for five cents each, by addressing the "Commissioner of Patents, Washington, D. C."